Aug. 28, 1945.    R. HARDY ET AL    2,383,857
ULTRA HIGH FREQUENCY WAVE COUPLING DEVICE
Filed April 24, 1942    2 Sheets-Sheet 1
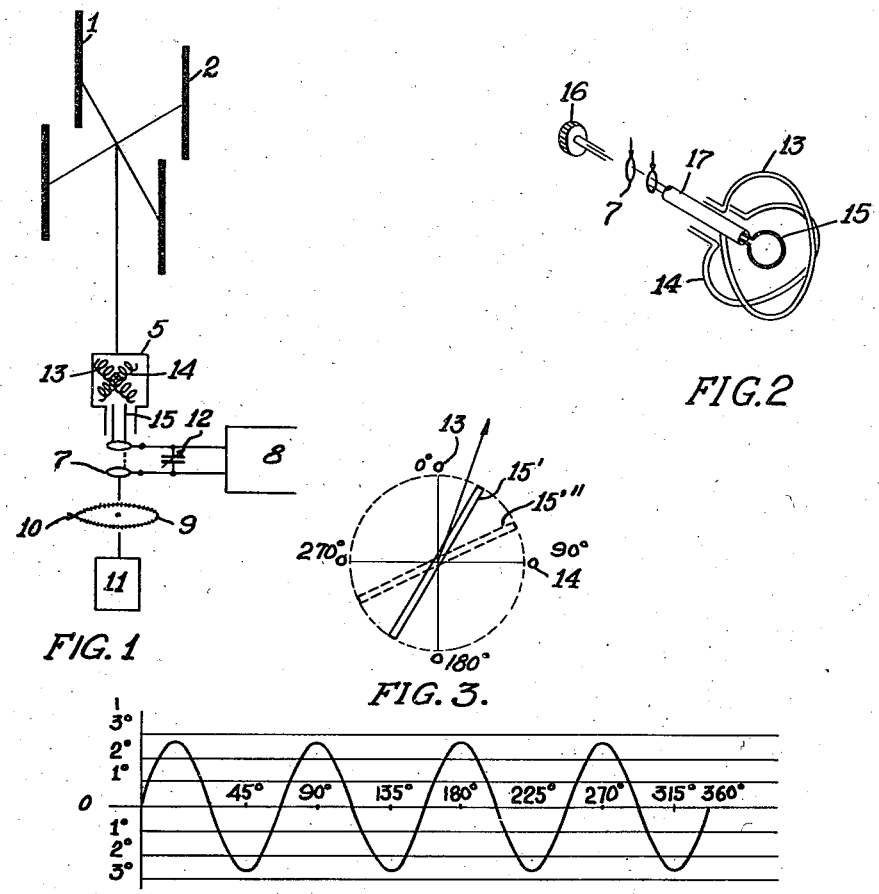
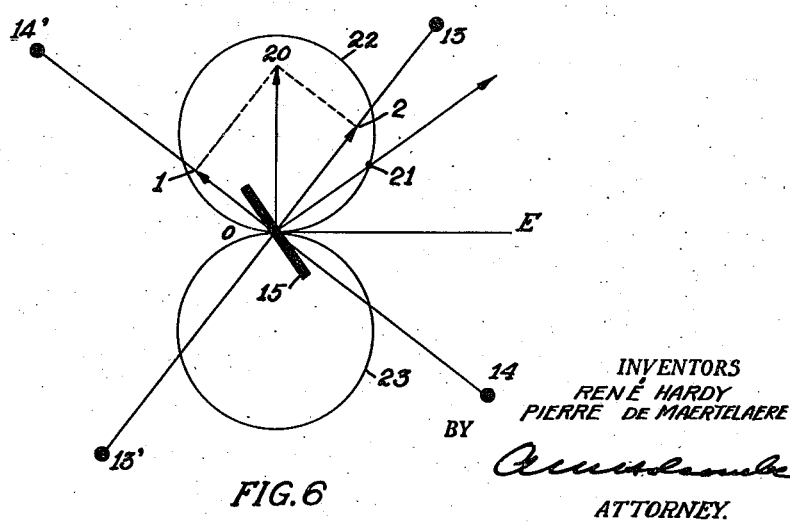
INVENTORS
RENÉ HARDY
PIERRE DE MAERTELAERE
BY
ATTORNEY.

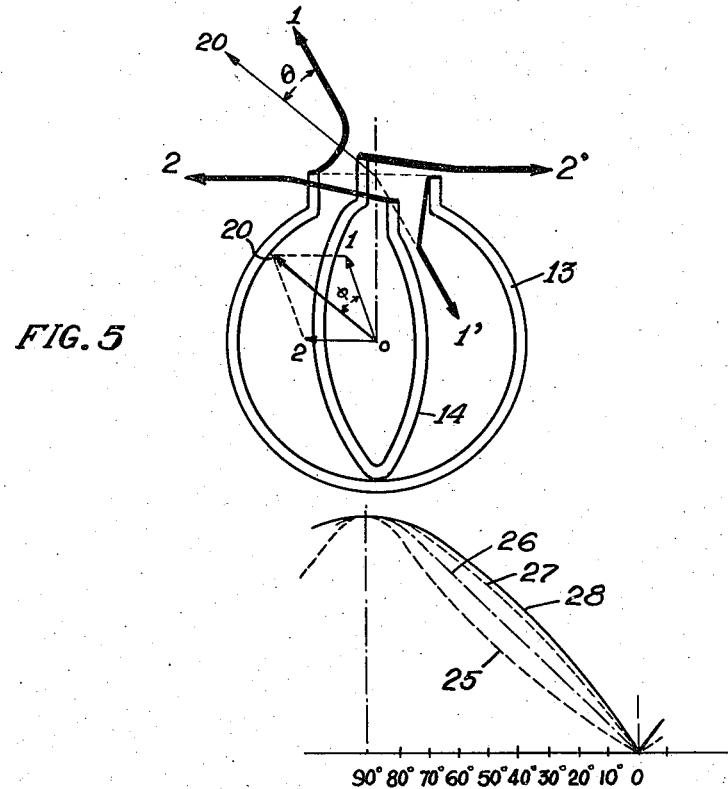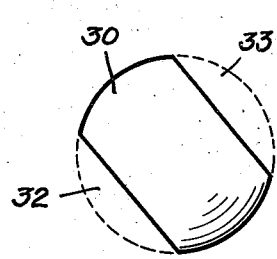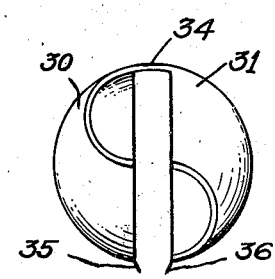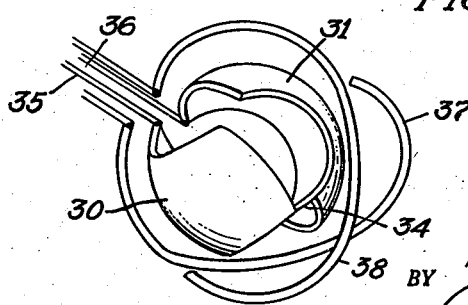

Patented Aug. 28, 1945

2,383,857

UNITED STATES PATENT OFFICE 2,383,857

ULTRA HIGH FREQUENCY WAVE COUPLING DEVICE

René Hardy and Pierre de Maertelaere, Lyon, France; vested in the Alien Property Custodian Application April 24, 1942, Serial No. 440,417
In France July 5, 1941

2 Claims. (Cl. 250—11)

The present invention relates to inductive coupling devices for high frequency electromagnetic waves, and particularly but not exclusively to ultra short wave direction finders.

In long and medium wave radio direction finding systems, use is frequently made of stationary aerials positioned in perpendicular planes and connected to the stators of a radio direction finder. The windings of the stator are perpendicular and they reproduce the field of the stationary aerials. A rotor that rotates within these windings may be considered as rotating in a field having the same orientation as that of the space occupied by the aerials. This requires that the radio direction finder should have the turns of its coil windings suitably distributed, so that the current induced in the rotor may always be proportional to the sine of the angle that is formed by the mean plane of the rotor with a reference plane.

In radio direction finders constructed for operating with ultra short waves, one is limited to considering finders that have only one winding turn for each stator and likewise only one winding turn for each rotor. It thus becomes impossible to employ a suitable distribution of the winding turns for correcting errors of variation in the current induced in the rotor at its various angular positions with respect to the above-mentioned reference plane.

One of the objects of the present invention is consequently that of providing radio direction finders which do not have errors of this kind in the variation of the current induced in the rotor. According to certain of its features, it attains this purpose by providing the use of a rotor that does not consist of a plane symmetrical winding turn, but of an element of such a geometrical configuration that the sinusoidal law is adhered to as a result of this configuration.

In one variant of the invention, the rotor of an ultra short wave radio direction finder or other inductive coupling device consists of two out-of-true surfaces having a symmetry with respect to a point, a straight line or a plane surface, and of such a shape that the voltages tapped at this rotor's terminals vary according to the desired sinusoidal law.

More specifically, in one example of embodiment that makes use of features of the invention, an ultra short wave induction finder or distributor comprises two orthogonal plane winding turns which serve as stators, and a rotor which consists of two diametral hemispherical zones assembled with their segments staggered by 90° (i. e. with a reciprocal angular displacement of 90°).

The invention will be explained in the following description given with reference to the appended drawings, in which:

Fig. 1 illustrates schematically one example of the arrangement of an ultra short wave radio direction finder.

Fig. 2 illustrates schematically an ultra short wave inductive finder or distributor which is specially suitable for the radio direction finding arrangement of Fig. 1.

Fig. 3 is a diagram that shows the manner in which the rotor of the finder of Fig. 2 brings about an octantal error of the induced current, the curve of this octantal error being illustrated in Fig. 4.

Fig. 5 in perspective, and Fig. 6 in plan view, illustrate a stator of an ultra short wave finder, together with diagrams of the respective fields.

Fig. 7 shows variation curves of the current induced in the rotor of an ultra short wave finder, and Figs. 8 to 10 illustrate one example of an embodiment of a rotor of an ultra short wave finder that makes use of features of the invention.

As shown in Fig. 1, an ultra short wave radio direction finder's receiver may comprise two aerial assemblies 1 and 2 disposed at 90° from each other and connected to the orthogonal stators 13 and 14 of a finder 5. The rotor 15 is connected by any suitable connecting means, e. g. by collector rings 7, to the input circuit of the receiver 8. A graduated dial 9 which moves over a stationary index 10 permits manual actuation of the finder's rotor 6. This drive may also be effected continuously by means of a motor 11.

The rotor of the finder 5 is tuned by means of a variable condenser 12, and the rotor 6-condenser 12 assembly serves as input circuit for the receiver 8, thus making it possible to avoid losses in the transmission of energy from the aerials 1 and 2 to the receiver 8.

In view of the wave lengths under consideration, the stators consist of single winding turns 13 and 14 (Fig. 2) positioned in perpendicular planes and respectively connected to the stationary aerials. The rotor likewise consists of a single winding turn 15 which is connected to the receiver by the collector 7 and may be manually driven by a control knob 16. The coupling between the feed of the stators and the output circuit of the rotor is obviated or lessened by means of a sheathing tube 17 which surrounds the connections of the rotor 15.

Inspection in Fig. 3 of one of the stationary winding turns of the stator, e. g. winding turn 13 which has an orientation of 0° to 180°, and of the movable winding turn 15 of the rotor that rotates within the stators 13 and 14, shows that there is no error in the amplitude of the wave transmitted from the stators to the rotor when the rotor's winding turn is in the plane of the stator's winding turn 13. However, when the rotor is in a certain position 15' or 15" and it indicates a zero value of the field induced by the stators, this value is wrong because the rotor is nearer to one of the stators than the other. If the resultant field has a minimum that lies at 45° or 145°, the indication given by the rotor's current will be correct because in this position the rotor is equidistant from the two stators; there is no asymmetry, and consequently no error. The cycle of error is repeated at each quadrant and this results in an octantal error curve of which an example is given in Fig. 4.

For the purpose of making more understandable the manner in which this octantal error occurs and the solution provided by the present invention, reference is made to Fig. 5 which gives a perspective view in two perpendicular planes of the two winding turns 13 and 14 which form the stators of the finder. These two turns are connected to the aerials 1, 1' and 2, 2' which consist, for example, of two orthogonal dipoles located in an unencumbered place where the propagation is uniform.

The direction of the field with respect to one of the aerials, e. g. is indicated at 20, the angle of this direction with respect to the aerial being $\theta$.

If $I_{max}$ is the current in the aerials 1, 1', and consequently in the winding turn 13, when the wave comes into the plane of the aerials, the current in the turn 13 ($I_{13}$) becomes for the represented direction of the field:

$$I_{13} = I_{max} \cos \theta \qquad (1)$$

Similarly, in winding turn 14 the induced current ($I_{14}$) will be:

$$I_{14} = I_{max} \cos(90° - \theta)$$
$$= I_{max} \sin \theta \qquad (2)$$

Since the two winding turns 13 and 14 that form the stator are in orthogonal planes, vectors $$\overrightarrow{0 \text{ to } 1} \text{ and } \overrightarrow{0 \text{ to } 2}$$

may be taken to represent the fluxes of the turns 13 and 14, these vectors being perpendicular.

The resultant flux is proportional to $$\overrightarrow{0.20}$$

and forms an $\varphi$ angle with $$\overrightarrow{0.1}.$$

It is possible to set down:

$$\text{tangent } \varphi = \frac{I_{max} \sin \varphi}{I_{max} \cos \theta} = \text{tangent } \theta \qquad (3)$$

i. e. $\theta = \varphi$; the angle of incidence of the wave with respect to the aerials 1, 1' is equal to the angle of the resultant flux with respect to the winding turn 13.

Since the angle $1\hat{0}2$ is a right angle, $$\overrightarrow{0.20}^2 = \overrightarrow{0.1}^2 + \overrightarrow{0.2}^2$$

which is equivalent to stating that the resultant flux is proportional to $$\sqrt{I_{max}^2(\cos^2 \theta + \sin^2 \theta)} \qquad (4)$$
$$= I_{max}$$

By examining the field produced in this way within the two winding turns of the stators, and a section of the stators as shown in Fig. 6, 13—13' being the section of the winding turn 14 and 14' the section of the other staggered by 90°, it is seen that $$\overrightarrow{0.20}$$

is the direction of the field resulting from the vectorial addition of the fields created by the currents $I_{13}$ and $I_{14}$.

Assuming that the wave field, repeated by the stators, is constant in the entire space that will be occupied by the rotor within the said stators, the flux that passes through the winding turn of the rotor 15 at all times is $$\phi = H_{max} S \sin \alpha \sin \omega t \qquad (5)$$

and the induced electromotive force is:

$$e = -\frac{2\pi C}{\lambda} H_{max} S \sin \alpha \cos \omega t \qquad (6)$$
$$= -e_{max} \cos \omega t$$

in which $$e_{max} = \frac{2\pi S}{\lambda} C H_{max}$$

the field being $H_{max} \sin \omega t$, the surface of the rotor's winding turn being indicated by S, the angle of the line normal to the plane of the rotor's winding with the direction $$\overrightarrow{0.20}$$

being $\alpha$ and the flux that passes through it at the moment $t$ being indicated by $\varphi$; C indicates the rate of propagation in air of an electromagnetic wave.

The orientation of the rotor accordingly makes it possible to ascertain the point of zero reception, i. e. the minimum and maximum of reception, which should be at 90° from each other.

A certain number of conditions have to be complied with in order to obtain a precise indication. First of all, the phase relation between the currents of the antennas is of great importance and, for this purpose, the transmission line leading from the aerials to the rotor's two winding turns, and also the rotor and the aerials themselves, have to be constructed in strictly symmetrical fashion.

It is not possible to tune the stator's two winding turns to operate at resonance and thus get the benefit of a considerable excess voltage. As a matter of fact, the current in the winding of a stator varies in dependence upon a slight variation of the pulsation of the current or of the frequency of the transmission, and all the more according as the excess voltage coefficient is greater. With very high excess voltage ultra short wave circuits there would occur, when close to resonance, a considerable variation of the current in the rotor's winding for very slight mechanical variations in the apparatus. As a rule, these mechanical variations correspond to variations of capacity.

Since the angle of the direction of the field reproduced by the two rectangular windings depends on the ratio of the intensities of the currents in the stators, the orientation of the field becomes wrong as soon as the slightest maladjustment occurs in the circuit, a variation of a few micromicrofarads corresponds to a considerable rotation of the field. It is therefore necessary to make use of an aperiodic circuit finder system, only the rotor being tuned or forming part of a tuned circuit, e. g. the input circuit of the receiver as shown in Fig. 1.

The field within the windings of the stators must be uniform. Even if the field reproduced by the two winding turns may be considered as a reproduction of the field of space, it is not necessarily uniform. This lack of uniformity becomes all the more apparent the more one departs from the shape of a long solenoid in constructing the stators, and this is the case in short wave finders that have stators consisting of only two winding turns, as this brings about a distortion of the field.

A rotor that consists of a single winding turn rotating within the two winding turns of the stators will not indicate the precise directions for various reasons, first of all on account of the shape of the field, and also on account of the capacities resulting from variations in the coupling of the rotor to the stators, these being all the greater because it is necessary to select diameters as close as possible for the winding turns of the stators and the rotor in order to insure efficient coupling.

The rotor's indications can accordingly only be correct when the rotor is in the plane of one of the stators and in the bisector planes. For the other positions, there will be a coupling error or octantal error, e. g. like the one shown in the curve of Fig. 4.

In order to correct these distortions of the field or, to be more exact, the octantal errors they occasion in the current induced in the rotor, it becomes necessary to deform the winding turns, either of the rotor or of the stator.

The simplest solution is to give consideration to a deformation of the single winding turn of the rotor. In order to undertake this modification, account is taken of the expression given above for the electromotive force induced in the rotor's winding:

$$e = -\frac{2\pi C}{\lambda} H_{max} S \sin \alpha \cos \omega t$$

It can be seen in Fig. 6 that this electromotive force is represented by the vector $$\overrightarrow{0.21}$$

whose end describes a circle 22 tangential at 0 to the plane E normal to the direction of propagation 20; for a complete rotation of the rotor, this corresponds to the complete diagram 22—23 of the classic figure of 8 shape of radio direction finders.

This variation of voltage may also be traced lineally. The curves 25, 26 and 27 of Fig. 7 show examples of this for finders that have an octantal error or defects in the distribution of the field. In order to restore the true sinusoidal curve 28 (Fig. 7), it is necessary to maintain the sinusoidal relation. If E is the voltage induced in the rotor 15 and α the angle of this rotor with respect to a stator, e. g. 13, E will always have to be proportional to sin α.

The present invention consequently provides for the construction of rotors for short wave radio direction finders which have stators that each consist of a single winding turn, by making use of an out-of-true winding turn that is suitably deformed in order to maintain the above mentioned sinusoidal relation. Furthermore, in order to insure efficient coupling between the stator and the rotor, another feature of the invention provides particularly for the use of a rotor that consists of an out-of-true surface that is symmetrical with respect to a plane surface, a straight line or a point, that has dimensions substantially equal to those of the stators, and that maintains the said sinusoidal relation.

Figs. 8 to 10 illustrate one example of an embodiment of a stator for ultra short wave finders that makes use of features of the invention. The rotor shown in these figures consists of two hemispherical metallic shells 30 and 31 each composed of integrally formed opposite segments and in each of which the two opposite half-domes have been cut away perpendicularly to the plane of their base, as shown at 32 and 33 in Fig. 8.

These two half-shells are assembled by a metallic connection (Fig. 9) with their segments staggered by 90° as shown, connection wires 35 and 36 being soldered at the point diametrically opposite to the connection 34.

A rotor of this kind, which is strongly coupled by mutual induction to two perpendicular stators 37 and 38 (Fig. 10) that each consist of one plane winding turn, is traversed during its rotation by an induced current having a substantially sinusoidal shape like that shown at 28 in Fig. 7, taking into account the distance between the stators and the rotor.

It is evident that the dimensions of the staggered segments will depend on the desired coupling between the rotor and the stators.

It is also evident that the invention is by no means limited to the shape of the rotor shown as an example, and that numerous other designs may be provided for the rotor without departing from the scope of the invention.

The uses to which the invention may be applied are not limited as above mentioned to radio direction finding; for example, the invention may also be used in the construction of progressive or any other kind of attenuators for determination of the output or input current of a generating or oscillating instrument, or even of an amplifier.

We claim:

1. A radio goniometer coil assembly comprising two orthogonal plane winding turns forming a stator and a rotor in coupling relation therewith consisting of two electrically connected diametral hemispherical zone portions each consisting of opposite segments assembled with the segments of the respective zone portions in 90° angular relation whereby the current induced in the rotor will remain sinusoidal with the elimination of octantal errors and circuit connections to the stator and to the rotor segments.

2. A radio goniometer coil assembly comprising two orthogonal plane winding turns forming a stator and a rotor in coupling relation therewith consisting of two electrically connected, diametral and substantially hemispherical zone portions each consisting of opposite segments and having side portions cut away and assembled with the segments of the respective zone portions in 90° angular relation whereby the current induced in the rotor will remain sinusoidal with the elimination of octantal errors and circuit connections to the stator and to the rotor, substantially as described.

RENÉ HARDY.
PIERRE DE MAERTELAERE.